Nov. 4, 1941.   A. N. MILSTER   2,261,398
STEERING AND BRAKING MECHANISM
Filed July 24, 1940
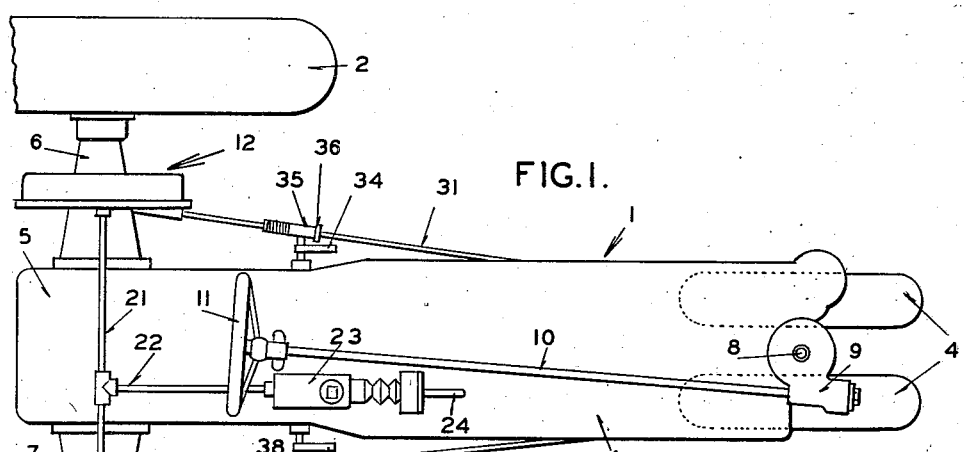
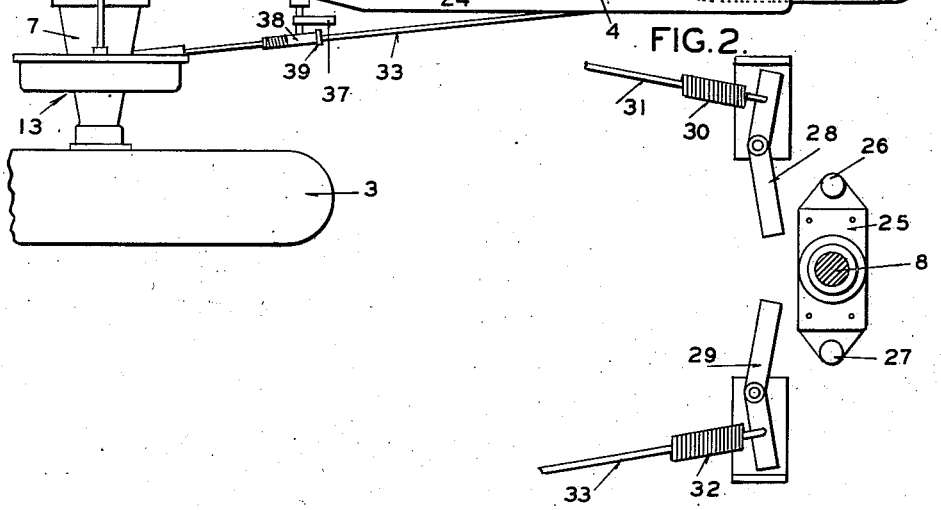
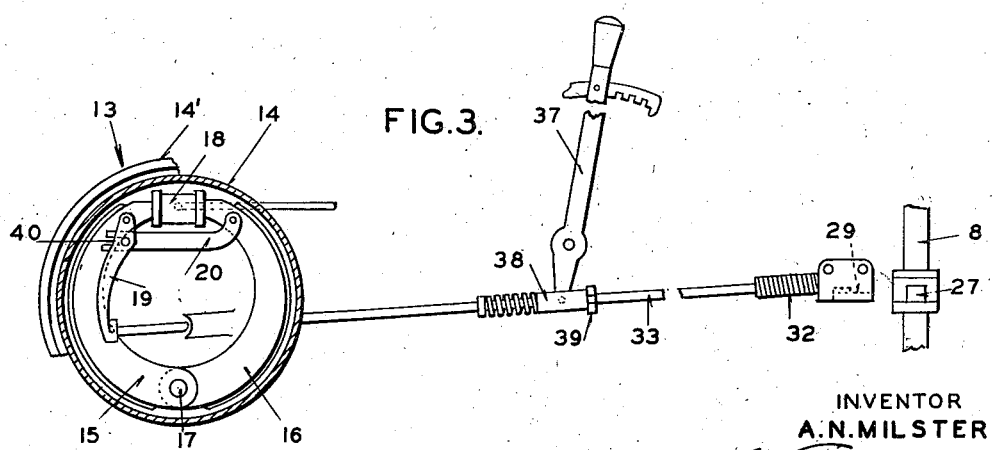
INVENTOR
A. N. MILSTER
BY
ATTORNEY Patented Nov. 4, 1941

2,261,398

UNITED STATES PATENT OFFICE 2,261,398

STEERING AND BRAKING MECHANISM

Arthur N. Milster, Ferguson, Mo., assignor to Wagner Electric Corporation, St. Louis, Mo., a corporation of Delaware Application July 24, 1940, Serial No. 347,194

6 Claims. (Cl. 180—18)

My invention relates to steering and braking mechanism and more particularly to one for use on a tractor vehicle whereby the braking system can be employed to aid the steering thereof.

One of the objects of my invention is to provide a braking system for two driving members of a vehicle which can be manually operated to brake both members simultaneously and which also can be operated by the steering mechanism of the vehicle to independently brake the members to thereby assist in the changing of the direction of the vehicle.

A more specific object of my invention is to provide a tractor with a brake for each of its two driving wheels, a hydraulic actuating system for simultaneously applying both brakes and a mechanical system for independently applying the brakes by the steering mechanism when operated to thus cause the brakes to assist in steering the tractor.

Other objects of my invention will become apparent from the following description taken in connection with the accompanying drawing in which Figure 1 is a top view of a tractor vehicle provided with my improved braking system; Figure 2 is a view, partly in section, showing how the brakes are selectively actuated by the steering mechanism of the tractor; and Figure 3 is a side view showing in detail one of the brakes and the hydraulic and mechanical actuating means therefor.

Referring in detail to the drawing, 1 indicates a farm tractor vehicle which is provided with two driving wheels 2 and 3 at its rear end and with two steering wheels 4 at its forward end. The rear wheels are driven from the engine through the differential gearing 5 and the axles 6 and 7. The steering wheels 4 are connected to a steering shaft 8 which is rotated in opposite directions by the usual gearing 9, a steering column 10 and a steering wheel 11 as is common practice.

The axle 6 for the wheel 2 has associated therewith a brake 12 and the axle 7 of wheel 3 has associated therewith a similar brake 13. As shown in Figure 3, each of these brakes comprises a drum 14 secured to the axle and a support or backing plate 14' secured to the axle housing. Within the drum and in cooperation therewith are mounted two brake shoes 15 and 16 pivoted at their bottom to the backing plate by an anchor pin 17. The upper free ends of the two shoes are adapted to be hydraulically actuated into engagement with the drum by a fluid motor 18. Also for actuating these ends of the shoes into engagement with the drum there is provided a mechanical mechanism which comprises a lever 19 pivoted on one shoe and connected intermediate its end by means of a link 20 with the other shoe. Thus, when the lever is moved in a counter-clockwise direction, as shown in Figure 3, the free ends of the shoes will be forced into engagement with the drum to apply the brakes.

The two fluid motors 18 of the brakes are interconnected by means of a conduit 21 which communicates with a conduit 22 leading from a master cylinder device 23 mounted on the tractor frame in a convenient position. This master cylinder is of known construction and includes a cylinder and piston (not shown) the latter being actuated to place the fluid under pressure by means of a pedal 24. Thus, when the pedal is actuated, fluid under pressure will be forced into the two fluid motors and the ends of the brake shoes in each brake will be moved into engagement with the drum to simultaneously brake the two wheels.

In order that the brakes may be independently applied by the steering mechanism when it is moved to steer the vehicle, the steering shaft 8 has secured thereto a member 25 carrying two upstanding pins 26 and 27 on opposite sides of the shaft. On opposite sides of the axis of the frame of the tractor are pivoted two levers 28 and 29, the former mounted to be engaged by the pin 26 when the steering shaft is moved in a counter-clockwise direction and the latter mounted to be engaged by the pin 27 when the steering shaft is moved in a clockwise direction. The lever 28 is connected by means of a spring 30 and rod 31 to the lever 19 of the brake 12 to thus actuate this brake by the mechanical linkage. Similarly, lever 29 is connected by a spring 32 and a rod 33 to the lever 19 of the brake 13 to thus permit actuation of the brake by its mechanical linkage.

In order that the brakes 12 and 13 may be applied manually and without the necessity of turning the steering shaft, the rod 31 has associated therewith a lever 34 pivotally mounted on the frame of the vehicle and connected to the rod by a spring-biased slidable sleeve 35 and a collar 36 secured to the rod. The rod 33 on the opposite side of the vehicle has associated therewith a lever 37 pivoted to the frame of the vehicle and connected to the rod by a spring-biased slidable sleeve 38 and a collar 39 secured to the rod.

In operation with the tractor vehicle equipped with the above described brake system, it is apparent that when the steering wheels 4 are turned by the steering mechanism in a counterclockwise direction to turn the vehicle shortly to the left, the pin 26 will engage and actuate the lever 28 and by means of the rod 31 apply brake 12 through lever 19 and link 20 thereof. Thus the wheel 2 will be held stationary and the tractor can pivot around this wheel in making the short turn. If the wheel 4 is turned in a clockwise direction to steer the tractor shortly to the right, the pin 27 will engage and actuate the lever 29 and by means of rod 33 apply the brake 13 by means of the lever 19 and link 20. When the brake 13 is applied, the tractor can pivot around the wheel 3 as an axis.

If it should be desired to apply either brake 12 or 13 to assist in steering the vehicle or for any other purpose when the steering wheels are not turned sufficiently to operate either the levers 28 or 29, such can be accomplished by operating the levers 34 or 37 pivoted on opposite sides of the vehicle frame.

When it is desired to apply both brakes 12 and 13 simultaneously and with equal pressure as in bringing the vehicle to a stop, the pedal 24 is depressed to thereby cause both brakes to be applied by means of the fluid motors 18. Due to the slot connection 40 between lever 19 and link 20, the rods 31 and 33 will not be moved when the brakes are applied by the fluid motor.

It is thus seen that when the vehicle is equipped with the braking system shown, the tractor can be controlled to the best advantage. In making short turns the proper brake will be automatically applied by the steering mechanism to thereby assist in making the short turns. When it is desired to stop the tractor, the brakes are controlled by hydraulic pressure and as much braking torque as desired can be employed. Also, when desired, the brakes may be independently applied manually by using part of the structure which is employed for applying the brakes by the steering mechanism.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In braking aparatus for a vehicle provided with driving wheels, a dirigible wheel and steering mechanism therefor, a brake for each of the driving wheels comprising a brake drum and friction means for cooperation therewith, manually-controlled means including connections for applying the friction means of both brakes simultaneously, means independent of said manual means and its connections and operable by the steering mechanism when moved to turn the dirigible wheel in one direction for applying the friction means of one brake only, other means also independent of said manual means and the connections and operable by the steering mechanism when moved to turn the dirigible wheel in the opposite directions for applying the friction means of the other brake only, and means including a lever for individually applying each brake, said last named means being independent of the manual means and the connections for simultaneously applying both brakes.

2. In braking apparatus for a vehicle provided with driving wheels, a dirigible wheel and steering mechanism therefor, a brake for each of the driving wheels comprising a brake drum and friction means for cooperation therewith, fluid pressure operated means for applying the friction means of both brakes simultaneously, a mechanical means for applying each brake friction means independently of the fluid pressure means, and means controlled by the steering mechanism when moved to steer the vehicle in one direction for operating the mechanical means of one brake only and other means controlled by the steering mechanism when moved to steer the vehicle in the opposite direction for operating the mechanical means of the other brake.

3. In braking apparatus for a vehicle provided with driving wheels, a dirigible wheel and steering mechanism therefor, a brake for each of the driving wheels comprising a brake drum and friction means for cooperation therewith, fluid pressure operated means for applying the friction means of both brakes simultaneously, a mechanical means for applying each brake friction means independently of the fluid pressure means, means actuated by the steering mechanism when moved to steer the vehicle in one direction for operating the mechanical means of one brake only, other means actuated by the steering mechanism when moved to steer the vehicle in the opposite direction for operating the mechanical means of the other brake, and manual means comprising a manually-operated lever for actuating each mechanical means individually.

4. In braking apparatus for a vehicle provided with driving wheels, a dirigible wheel and steering mechanism therefor, a brake for each of the driving wheels comprising a brake drum and friction means for cooperation therewith, a fluid motor for actuating the friction means, a source of fluid pressure connected to each fluid motor, manually-controlled means for causing fluid pressure to be transmitted to both motors to apply the brakes simultaneously, mechanical means independent of the motor to apply each brake, and means including mechanical connections separate from the manually-controlled means for causing the mechanical means of the left wheel brake to be actuated to apply said brake when the steering mechanism is moved to turn the dirigible wheel to the left and for causing the mechanical means of the right wheel brake to be actuated to apply said brake when the steering mechanism is moved to turn the dirigible wheel to the right.

5. In braking apparatus for a vehicle provided with driving wheels, a dirigible wheel and steering mechanism therefor, a brake for each of the driving wheels comprising a brake drum and friction means for cooperation therewith, a fluid motor for actuating the friction means, a source of fluid pressure connected to each fluid motor, manually-controlled means for causing fluid pressure to be transmitted to both motors to apply the brakes simultaneously, mechanical means independent of the motor to apply each brake, means including connections for causing the mechanical means of the left wheel brake to be actuated to apply said brake when the steering mechanism is moved to turn the dirigible wheel to make a short left turn and for causing the mechanical means of the right wheel brake to be actuated to apply said brake when the steering mechanism is moved to turn the dirigible wheel to make a short right turn, and means including a hand lever for operating the mechanical means of each brake individually notwithstanding the steering mechanism is not moved.

6. In braking apparatus for a vehicle provided with driving wheels, a dirigible wheel and steering mechanism, a brake for each driving wheel comprising a drum and friction means having expansible ends, a fluid motor for expanding the ends, a lever and link mechanism for also expanding the said ends, a source of fluid pressure connected to operate the fluid motors simultaneously, and means independent of the fluid motor and pressure source and controlled by the steering mechanism for operating the lever and link mechanism of each brake individually depending upon the direction said steering mechanism is moved to turn the dirigible wheel and change the direction of movement of the vehicle.

ARTHUR N. MILSTER.